United States Patent
Komano et al.

(10) Patent No.: US 8,401,180 B2
(45) Date of Patent: Mar. 19, 2013

(54) NON-LINEAR DATA CONVERTER, ENCODER AND DECODER

(75) Inventors: Yuichi Komano, Kawasaki (JP); Hideo Shimizu, Kawasaki (JP); Koichi Fujisaki, Kawasaki (JP); Hideyuki Miyake, Ota-ku (JP); Atsushi Shimbo, Bunkyo-ku (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1398 days.

(21) Appl. No.: 12/053,143

(22) Filed: Mar. 21, 2008

(65) Prior Publication Data

US 2008/0292100 A1    Nov. 27, 2008

(30) Foreign Application Priority Data

May 24, 2007    (JP) .................................. 2007-137842

(51) Int. Cl.
*H04K 1/00* (2006.01)
(52) U.S. Cl. ........................... 380/29; 713/194; 380/263
(58) Field of Classification Search .................... 380/29, 380/263; 713/194
See application file for complete search history.

(56) References Cited

U.S. PATENT DOCUMENTS

| | | | | |
|---|---|---|---|---|
| 6,940,975 | B1 * | 9/2005 | Kawamura et al. ............. | 380/37 |
| 2003/0048903 | A1 * | 3/2003 | Ito et al. ........................ | 380/263 |
| 2007/0071235 | A1 | 3/2007 | Fujisaki et al. | |

FOREIGN PATENT DOCUMENTS

| JP | 2000-66585 | 3/2000 |
|---|---|---|
| JP | 2002-366029 | 12/2002 |

OTHER PUBLICATIONS

"Differential Power Analysis" by Paul Kocher et al, in proceedings of advances in Cryptology—CRYPTO'9 Springer-Verlag, 1999, pp. 388-397.*
"Bitwise Higher Order Differential Cryptanalysis"; Zhu et al, Department of Computer Science and Engineering, Shanghai Jiao Tong University, China; INTRUST 2009, LNCS 6163, pp. 250-262, 2010; copyright by Springer-Verlag Berlin Heidelberg 2010.*
"Higher Order Differential Attack of a CAST Cipher"; Moriai et al; TAO(Telecommunications Advancement Organization of Japan) and Science University of Tokyo; Fast Software Encryption FSE'98, LNCS 1372, pp. 17-31, 1998. copyright by Springer-Verlag Berlin Heidelberg 1998.*
Jiqiang LV, et al., "Enhanced DES Implementation Secure Against High-Order Differential Power Analysis in Smartcards", Information Security and Privacy; Lecture Notes in Computer Science, vol. 3574, XP-019011685, Jun. 30, 2005, pp. 195-206.
Mehdi-Laurent Akkar, et al., "A Generic Protection against High-Order Differential Power Analysis", LNCS, [Online], vol. 2887, XP-002497388, Feb. 19, 2004, pp. 192-205.

* cited by examiner

*Primary Examiner* — Taghi Arani
*Assistant Examiner* — Jason Lee
(74) *Attorney, Agent, or Firm* — Oblon, Spivak, McClelland, Maier & Neustadt, L.L.P.

(57) ABSTRACT

According to an aspect of the present invention, there is provided a non-linear data converter including: first to fourth converters that each performs a respective converting process on an input bit string to output respective output bit string; a generator that generates a random number bit string; and a selector that selects any one of the output bit strings from the first to fourth converters based on the random number bit string. Each of the converting processes is equivalent to performing a first mask process, a non-linear conversion predetermined for an encoding or a decoding and a second mask process.

3 Claims, 11 Drawing Sheets

NON-LINEAR DATA CONVERTER, ENCODER AND DECODER

CROSS-REFERENCE TO RELATED APPLICATIONS

The entire disclosure of Japanese Patent Application No. 2007-137842 filed on May 24, 2007 including specification, claims, drawings and abstract is incorporated herein by reference in its entirety.

BACKGROUND OF THE INVENTION

1. Field of the Invention

An aspect of the present invention relates to a non-linear data converter, an encoder and a decoder.

2. Description of the Related Art

An encoder or a decoder by a common key encoding system such as a DES (Data Encryption Standard) is mounted on an IC card or the like and widely used. It is very important to protect a secret key from an illegal access.

For instance, as disclosed in JP-A-2000-66585 showing a counter measure to an illegal access such as a DPA (Differential Power Analysis) for estimating a secret key from a consumed electric power during the operation of an encoder or a decoder, a method is reported that a predetermined mask value and a mask value obtained by inverting bits thereof are selected at random for each encoding operation or decoding operation to perform a mask process.

However, in JP-A-2000-66585, a resistance to a high-order DPA for estimating the secret key from a consumed electric power at a plurality of timings is not considered.

SUMMARY OF THE INVENTION

According to an aspect of the present invention, there is provided a non-linear data converter including: a first converter that performs a first process on an input bit string to output a first output bit string, the first process equivalent to performing: a mask process using a first mask, a non-linear conversion predetermined for performing an encoding or a decoding, and a mask process using a second mask; a second converter that performs a second process on the input bit string to output a second output bit string, the second process equivalent to performing: the mask process using the first mask, the non-linear conversion, and a mask process using an inverted second mask; a third converter that performs a third process on the input bit string to output a third output bit string, the third process equivalent to performing: a mask process using an inverted first mask, the non-linear conversion, and the mask process using the second mask; a fourth converter that performs a fourth process on the input bit string to output a fourth output bit string, the fourth process equivalent to performing: the mask process using the inverted first mask, the non-linear conversion, and the mask process using the inverted second mask; a generator that generates a random number bit string; and a selector that selects any one of the first to fourth output bit strings based on the random number bit string.

According to anther aspect of the present invention, there is provided a non-linear data converter including: a first converter that performs a first process on an input bit string to output a first output bit string, the first process equivalent to performing: a mask process using a first mask, a non-linear conversion predetermined for performing an encoding or a decoding, and a mask process using a second mask; a first inverter that inverts the first output bit string to output a second output bit string; a second converter that performs a second process on the input bit string to output a third output bit string, the second process equivalent to performing: a mask process using an inverted first mask, the non-linear conversion, and the mask process using the second mask; a second inverter that inverts the third output bit string to output a fourth output bit string; a generator that generates a random number bit string; and a selector that selects any one of the first to fourth output bit strings based on the random number bit string.

According to still anther aspect of the present invention, there is provided an encoder including: a key scheduler that generates a j-th enlarged key from a secret key, j being an integer larger than 1 and smaller than z, z being an integer larger than 2; a random number generator that generates a j-th random number bit string; a mask generator that generates a j-th first mask and a j-th second mask based on the j-th random number bit string, a predetermined first mask and a predetermined second mask; a pre-processor that outputs a first bit string based on an input plaintext block; a j-th function calculator that performs an encoding calculation to a j-th bit string to output a (j+1)-th bit string; and a post-processor that outputs a ciphertext block based on a (Z+1)-th bit string; wherein the j-th function calculator includes: a first converter that performs a first process on the j-th bit string to output a first converted bit string, the first process equivalent to performing: a mask process using the j-th first mask, a non-linear conversion predetermined for performing an encoding, and a mask process using the j-th second mask; a second converter that performs a second process on the j-th bit string to output a second converted bit string, the second process equivalent to performing: the mask process using the j-th first mask, the non-linear conversion, and a mask process using an inverted j-th second mask; a third converter that performs a third process on the j-th bit string to output a third converted bit string, the third process equivalent to performing: a mask process using an inverted j-th first mask, the non-linear conversion, and the mask process using the j-th second mask; a fourth converter that performs a fourth process on the j-th bit string to output a fourth converted bit string, the fourth process equivalent to performing: the mask process using the inverted j-th first mask, the non-linear conversion, and the mask process using the inverted j-th second mask; and a selector that selects any one of the first to fourth converted bit strings based on the j-th random number bit string to output as the (j+1)-th bit string.

According to still anther aspect of the present invention, there is provided a decoder including: a key scheduler that generates a j-th enlarged key from a secret key, j being an integer larger than 1 and smaller than z, z being an integer larger than 2; a random number generator that generates a j-th random number bit string; a mask generator that generates a j-th first mask and a j-th second mask based on the j-th random number bit string, a predetermined first mask and a predetermined second mask; a pre-processor that outputs a first bit string based on an input ciphertext block; a j-th function calculator that performs a decoding calculation to a j-th bit string to output a (j+1)-th bit string; and a post-processor that outputs a decoded sentence block based on a (Z+1)-th bit string; wherein the j-th function calculator includes: a first converter that performs a first process on the j-th bit string to output a first converted bit string, the first process equivalent to performing: a mask process using the j-th first mask, a non-linear conversion predetermined for performing an encoding, and a mask process using the j-th second mask; a second converter that performs a second process on the j-th bit string to output a second converted bit string, the second process equivalent to performing: the mask process using the j-th first mask, the non-linear conversion, and a mask process using an inverted j-th second mask; a third converter that performs a third process on the j-th bit string to output a third converted bit string, the third process equivalent to performing: a mask process using an inverted j-th first mask, the non-linear conversion, and the mask process using the j-th second mask; a fourth converter that performs a fourth process on the j-th bit string to output a fourth converted bit string, the fourth process equivalent to performing: the mask process using the inverted j-th first mask, the non-linear conversion, and the mask process using the inverted j-th second mask; and a selector that selects any one of the first to fourth converted bit strings based on the j-th random number bit string to output as the (j+1)-th bit string.

According to still anther aspect of the present invention, there is provided an encoder including: a key scheduler that generates a j-th enlarged key from a secret key, j being an integer larger than 1 and smaller than z, z being an integer larger than 2; a random number generator that generates a j-th random number bit string; a mask generator that generates a j-th first mask and a j-th second mask based on the j-th random number bit string, a predetermined first mask and a predetermined second mask; a pre-processor that outputs a first bit string based on an input plaintext block; a j-th function calculator that performs an encoding calculation to a j-th bit string to output a (j+1)-th bit string; and a post-processor that outputs a ciphertext block based on a (Z+1)-th bit string; wherein the j-th function calculator includes: a first converter that performs a first process on the j-th bit string to output a first converted bit string, the first process equivalent to performing: a mask process using the j-th first mask, a non-linear conversion predetermined for performing an encoding process, and a mask process using the j-th second mask; a first inverter that inverts the first converted bit string to output a second converted bit string; a second converter that performs a second process on the j-th bit string to output a third converted bit string, the second process equivalent to performing: a mask process using an inverted j-th first mask, the non-linear conversion, and the mask process using the j-th second mask; a second inverter that inverts the third converted bit string to output a fourth converted bit string; and a selector that selects any one of the first to fourth converted bit strings based on the j-th random number bit string to output as the (j+1)-th bit string.

According to still anther aspect of the present invention, there is provided a decoder including: a key scheduler that generates a j-th enlarged key from a secret key, j being an integer larger than 1 and smaller than z, z being an integer larger than 2; a random number generator that generates a j-th random number bit string; a mask generator that generates a j-th first mask and a j-th second mask based on the j-th random number bit string, a predetermined first mask and a predetermined second mask; a pre-processor that outputs a first bit string based on an input ciphertext block; a j-th function calculator that performs a decoding calculation to a j-th bit string to output a (j+1)-th bit string; and a post-processor that outputs a decoded sentence block based on a (Z+1)-th bit string; wherein the j-th function calculator includes: a first converter that performs a first process on the j-th bit string to output a first converted bit string, the first process equivalent to performing: a mask process using the j-th first mask, a non-linear conversion predetermined for performing an encoding process, and a mask process using the j-th second mask; a first inverter that inverts the first converted bit string to output a second converted bit string; a second converter that performs a second process on the j-th bit string to output a third converted bit string, the second process equivalent to performing: a mask process using an inverted j-th first mask, the non-linear conversion, and the mask process using the j-th second mask; a second inverter that inverts the third converted bit string to output a fourth converted bit string; and a selector that selects any one of the first to fourth converted bit strings based on the j-th random number bit string to output as the (j+1)-th bit string.

BRIEF DESCRIPTION OF THE DRAWINGS

Embodiment may be described in detail with reference to the accompanying drawings, in which.

DETAILED DESCRIPTION OF THE INVENTION

Embodiments will be described below.
(Basic Structure of DES)

Figure 1:
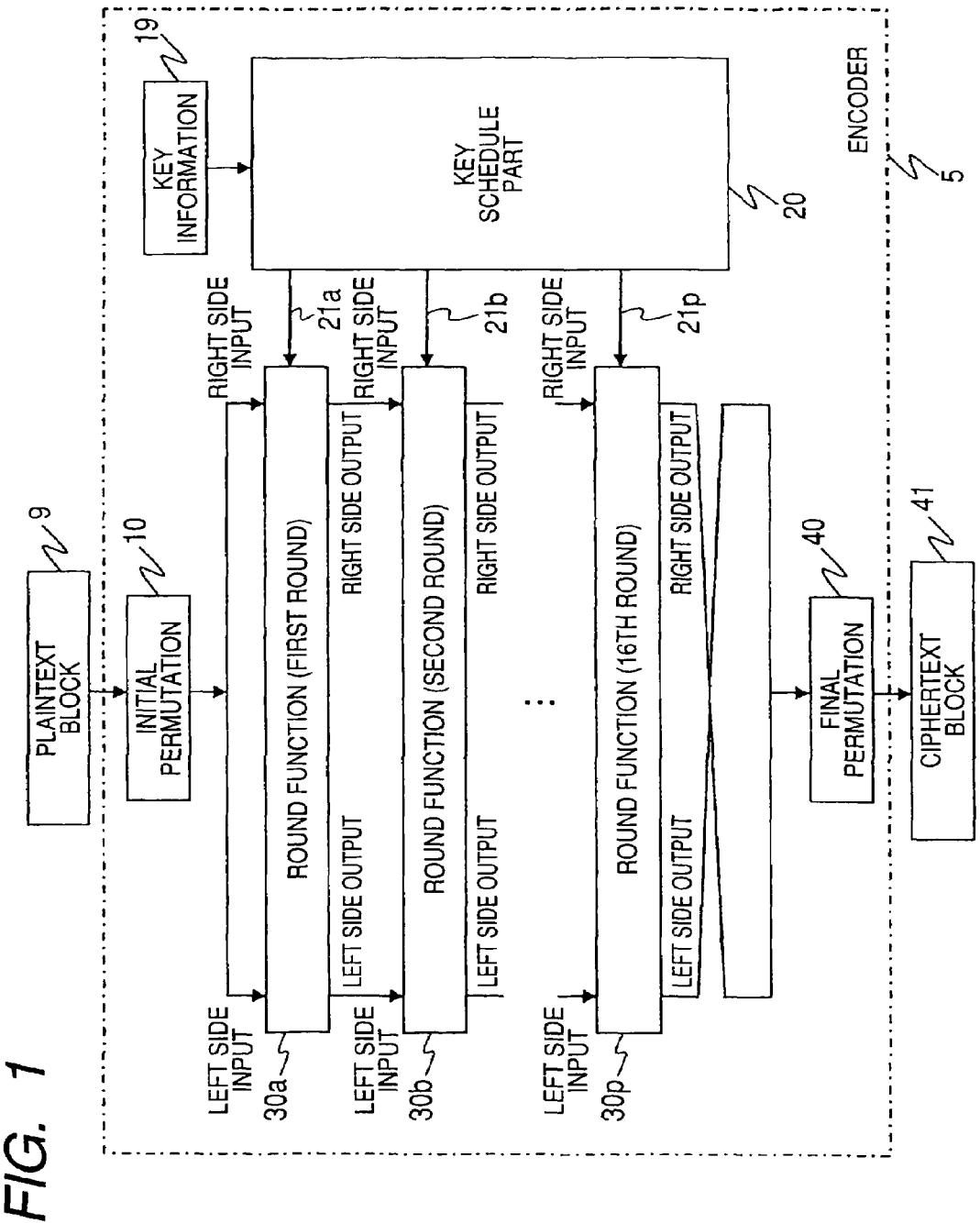
FIG. 1 is a block diagram showing a basic structure of an encoder based on an encoding algorithm DES.

FIG. 1 is a block diagram showing a basic structure of an encoder 5 of an encoding algorithm DES (Data Encryption Standard).

A key schedule part 20 calculates extension keys 21a, 21b, . . . , 21p by using key information 19 held as secret information. The extension keys 21a, 21b, . . . , 21p are supplied to the round functions 30a to 30p of a first round to a 16 th round. The round functions 30a to 30p respectively agitate a plaintext block 9 (64 bits) by using the extension keys 21a, 21b, . . . , 21p. The plaintext block 9 is permutated by an initial permutation IP 10, then respectively agitated by the round functions 30a to 30p and finally permutated by a final permutation FP 40 to become a ciphertext block 41.

After the plaintext block 9 is permutated by the initial permutation IP10, the plaintext block is divided into upper 32 bits and lower 32 bits which are input to a right side input and a left side input of the round function 30a of the first round. Similarly, the round function 30a of the first round outputs two bit strings (32 bits) respectively from a right side output and a left side output.

The two bit strings output by the round function 30a of the first round are input to the round function 30b of the second round. That is, the bit string output from the right side output of the round function 30a of the first round is input to the right side input of the round function 30b of the second round and the bit string output from the left side output of the round function 30a of the first round is input to the left side input of the round function 30b of the second round. After that, in the round functions 30b to 30p of the second round to the 16 th round, the same processes are repeated. Two bit strings as outputs of the round function 30p of the 16 th round whose orders are changed are concatenated together and input to the final permutation FP40.

Figure 2:
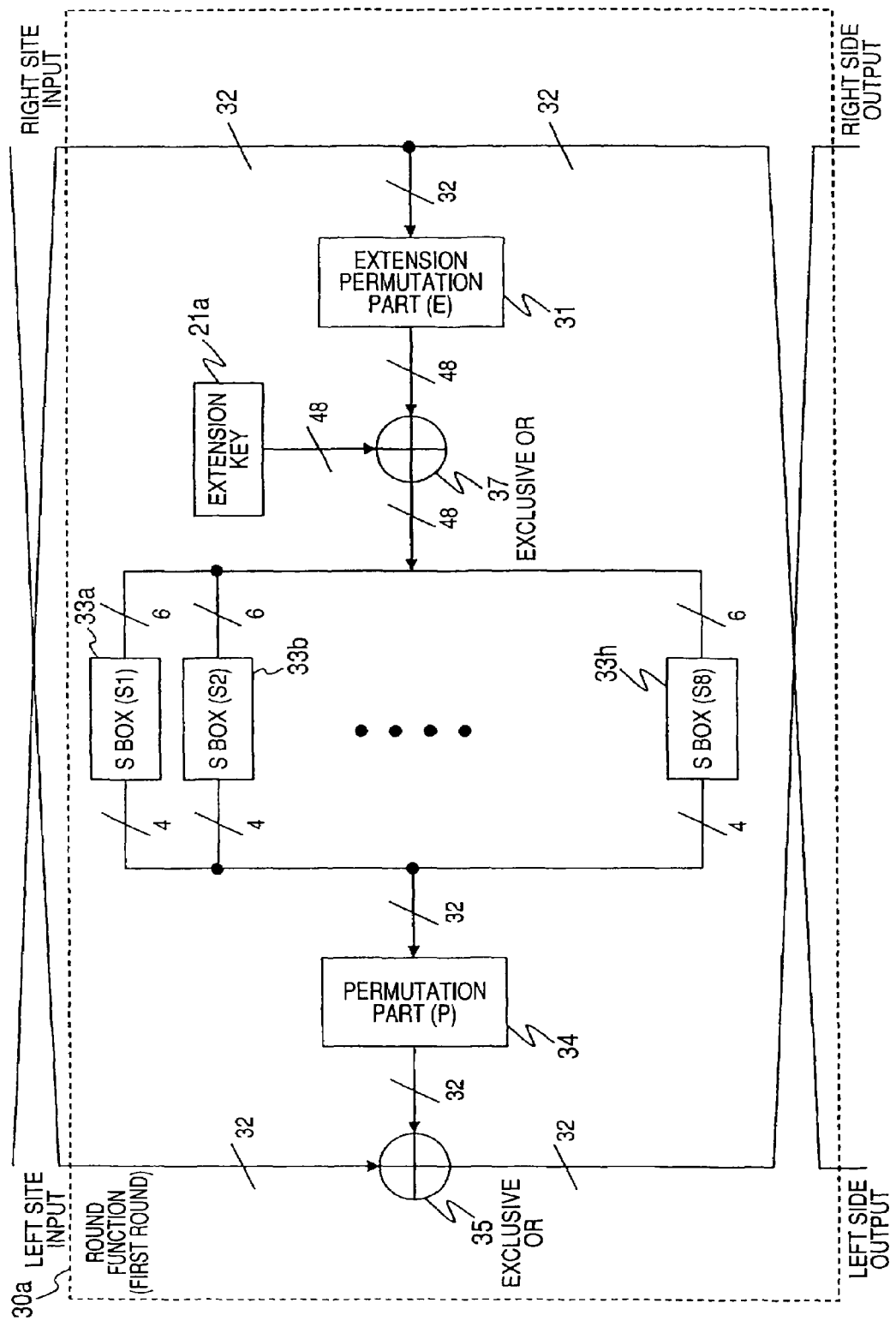
FIG. 2 is a block diagram showing a basic structure of a round function of a first round of the encoding algorithm DES.

FIG. 2 is a diagram showing the structure of the round function 30a of the first round. It is understood that the round functions 30b to 30p of the second round to the 16 th round have the same structures.

The round function 30a of the first round includes an extension permutation E31, an exclusive OR 37 that performs an exclusive OR calculation of an output of the extension permutation E31 and the extension key 21a, eight S boxes (S1, S2, . . . , S8) 33a to 33h, a permutation P34, and an exclusive OR 35 for performing an exclusive OR calculation of an output of the permutation P34 and the left side input of 32 bits of the round function 30a of the first round.

The right side input of 32 bits of the round function 30a of the first round is permutated by the extension permutation E31 and extended to 48 bits. Then, the exclusive OR 37 performs an exclusive OR calculation of the output of 48 bits from the extension permutation E31 and the extension key 21a of 48 bits. The output of 48 bits from the exclusive OR 37 is equally divided into eight bit strings at intervals of 6 bits which are respectively input to the eight S boxes (S1, S2, . . . , S8) 33a to 33h.

The S boxes (S1, S2, . . . , S8) 33a to 33h respectively non-linearly convert the input bit strings of 6 bits into bit strings of 4 bits. For instance, a table showing an input and output relation of the S box (S1) 33a of the DES is displayed in table 1.

TABLE 1

|  |  | column number | | | | | | | | | | | | | | | |
|---|---|---|---|---|---|---|---|---|---|---|---|---|---|---|---|---|---|
|  |  | 0 | 1 | 2 | 3 | 4 | 5 | 6 | 7 | 8 | 9 | 10 | 11 | 12 | 13 | 14 | 15 |
| row | 0 | 14 | 4 | 13 | 1 | 2 | 15 | 11 | 8 | 3 | 10 | 6 | 12 | 5 | 9 | 0 | 7 |
| number | 1 | 0 | 15 | 7 | 4 | 14 | 2 | 13 | 1 | 10 | 6 | 12 | 11 | 9 | 5 | 3 | 8 |
|  | 2 | 4 | 1 | 14 | 8 | 13 | 6 | 2 | 11 | 15 | 12 | 9 | 7 | 3 | 10 | 5 | 0 |
|  | 3 | 15 | 12 | 8 | 2 | 4 | 9 | 1 | 7 | 5 | 11 | 3 | 14 | 10 | 0 | 6 | 13 |

Two bits (0 to 3: binary number) composed of a most significant bit and a least significant bit of 6 input bits designate row numbers of the S box (S1) 33a shown in table 1. The row numbers of the S box (S1) 33a shown in the Table 1 are set to 0, 1, 2 and 3 from an upper part. 4 bits (0 to 15: binary number) remaining by excluding the most significant bit and the least significant bit from the six input bits designate column numbers of the S box (S1) 33a shown in the Table 1. The column numbers of the S box (S1) 33a shown in the Table 1 are counted as 1, 1, 2, 3, . . . , 15 from a left end.

Assuming that the bit string input to the S box (S1) 33a is "011011", the row number is "1" (01/b: binary) and the column number is "13" (1101/b), so that an output value "5" is obtained. Accordingly, the output of the S box (S1) 33a is "0101". The S box (S1) 33a includes six input lines (one corresponds to 1 bit) and four output lines (one corresponds to 1 bit) and is formed with a suitable combination of wiring and logical elements (NAND, NOR or the like) for connecting the input lines to the output lines so that the input and output relation shown in the table 1 is obtained.

32 bits obtained by sequentially concatenating the bit strings (4 bit×8) respectively output from the S boxes (S1, S2, . . . , S8) including the output bit string of the S box (S1) 33a to the output bit string of the S box (S8) 33h are permutated by the permutation P34. Then, the exclusive OR 35 performs an exclusive OR calculation of the output of 32 bits from the permutation P34 and the left side input of 32 bits of the round function 30a of the first round. The calculated result of the exclusive OR 35 becomes the right side output of 32 bits from the round function 30a of the first round. The left side output of the round function 30a of the first round is the same as the right side input.

(First Embodiment)

Figure 3:
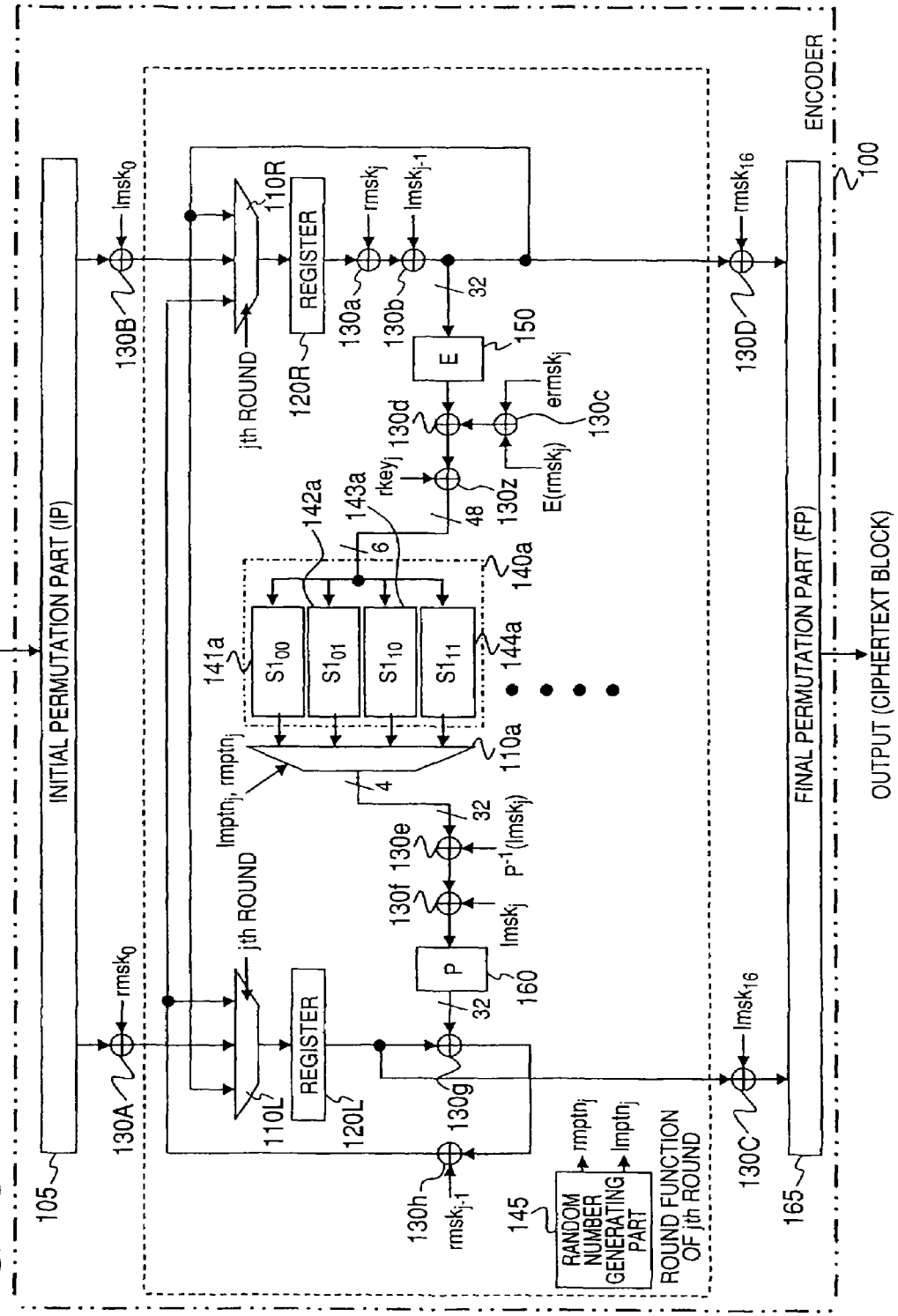
FIG. 3 is a block diagram showing a structure of an encoding calculation circuit according to a first embodiment.

FIG. 3 is a block diagram showing an encoder 100 according to a first embodiment. The encoder 100 according to the first embodiment includes an initial permutation part (IP) 105 for performing an initial permutation of an externally input plaintext block of 64 bits, exclusive ORs 130A and 130B for performing an exclusive OR calculation of a bit string output by the initial permutation part 105 and mask values $rmsk_0$ and $lmsk_0$, exclusive ORs 130a to 130h for performing an exclusive OR calculation for a mask process or a mask removing process, a selector 110L for selecting a left side input of 32 bits of a round function from any one of an output of the exclusive OR 130A, an output of the exclusive OR 130h and an output of the exclusive OR 130b, a selector 110R for selecting the right side input of 32 bits of the round function from any one of an output of the exclusive OR 130B, an output of the exclusive OR 130h and an output of the exclusive OR 130b, registers 120L and 120R for storing outputs of 32 bits from the selectors 110L and 110R, an exclusive OR 130z for performing an exclusive OR calculation of an output of the exclusive OR 130d and an extension key $rkey_j$, a random number generating part 145 for generating a random number bit string for each round function, an extension permutation part (E) 150, a permutation part (P) 160, exclusive ORs 130C and 130D for performing an exclusive OR calculation of two outputs of the round function of a 16 th round and below described mask values $rmsk_{16}$ and $lmsk_{16}$ and a final permutation part (FP) 165 for performing a final permutation to a received bit string to output a ciphertext block of 64 bits to an external part.

The encoder 100 according to the first embodiment includes four respectively different modified S boxes 141a to 144a (first group of modified S boxes 140a) that are formed in accordance with a non-linear converting system of the S box (S1) 33a of a DES and a selector 110a for selecting one of outputs of the four modified S boxes 141a to 144a of the first group of modified S boxes.

Although eight groups of the four modified S boxes 141a to 144a are provided as similarly to FIG. 2, the boxes are omitted from FIG. 3 due to a limitation in the sheet size. It is understood that there are the first group of modified S boxes 140a including the four respectively different modified S boxes to the eighth group of modified S boxes which are respectively formed in accordance with the non-linear converting system. It is understood that there are selectors $110a$ to $110h$ for respectively selecting the outputs of the first group of modified S boxes $140a$ to the eighth group of modified S boxes $140h$.

The initial permutation 105, the selectors 110L and 110R, the registers 120L and 120R, the exclusive ORs 130A to 130D, $130a$ to $130h$ and $130z$, the first group of modified S boxes $140a$ to the eighth group of modified S boxes $140h$ (in this case, a second group of modified S boxes $140b$ to the eighth group of modified S boxes $140h$ are not shown), the extension permutation part 150, the permutation part 160 and the final permutation part 165 operate synchronously with a clock signal.

The random number generating part 145 generates two random number bit strings of 8 bits ($lmptn_j$, $rmptn_j$) (j=1, 2, ..., 16) respectively for the calculation of the round functions (from the first round to the 16 th round).

Mask values ($rmsk_j$, $lmsk_j$) of 32 bits and a mask value ($ermsk_j$) of 48 bits are mask values generated in accordance with the random number bit strings ($lmptn_j$, $rmptn_j$) and a mask value "a" (it cannot be externally detected) of 4 bits that is predetermined in the encoder 100. In a below-description, "a–" designates a bit string of 4 bits obtained by inverting "a" for each bit, "a'" designates a bit string of 6 bits shown by "0||a||0|" and "a'–" designates a bit string shown by "1||a–||1". "||" shows a bit concatenation.

The mask values of ($lmsk_j$, $rmsk_j$) of 32 bits are generated by extending each of the bits of the random number bit strings ($lmptn_j$, $rmptn_j$) of 8 bits to 4 bits. For instance, when the random number bit string ($lmptn_j$) is "11010100", the mask value ($lmsk_j$) of 32 bits is "a–||a–||a||a–||a||a–||a||a" (a is 4 bits). When the random number bit string ($rmptn_j$) is "01011010", the mask value ($rmsk_j$) of 32 bits is "a||a–||a||a–||a–||a||a–||a".

The mask value ($ermsk_j$) of 48 bits is generated by extending each of the bits of the random number bit string ($rmptn_j$) of 8 bits to 6 bits. When the random number bit string ($rmptn_j$) is "01011010", the mask value of ($ermsk_j$) of 48 bits is "0||a||0||1||a–||1||0||a||0||1||a–||1||1||a–||||1||0||a||0||1||a–||1||0||a||0".

Figure 4:
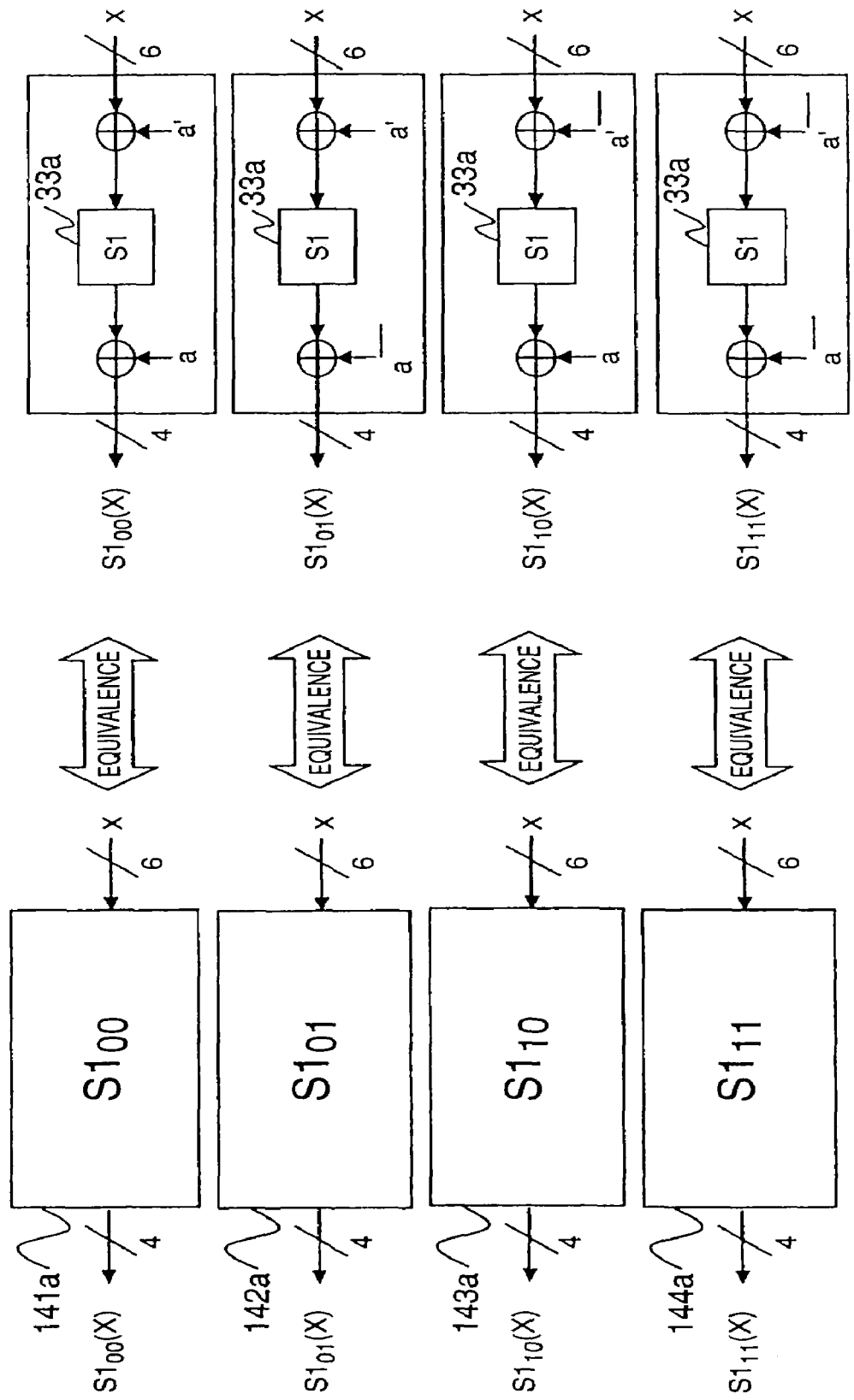
FIG. 4 is a block diagram showing equivalent circuits of modified S boxes ($S1_{00}$, $S1_{01}$, $S1_{10}$, $S1_{11}$) according to the first embodiment.

FIG. 4 is a block diagram showing equivalent circuits of the modified S boxes ($S1_{00}$, $S1_{01}$, $S1_{10}$, $S1_{11}$) $141a$ to $144a$ provided in the first group of modified boxes $140a$ in a right side. It is understood that the equivalent circuits are the same as those provided in the second group of modified S boxes $140b$ to the eighth group of modified S boxes $140h$ that are not shown in the drawing.

When a bit string x of 6 bits is input to the S boxes (Si) $33a$ to $33h$ (i=1, 2, ..., 8) of the DES, the S boxes output bit strings Si(x) of 4 bits. That is, when the bit string of 6 bits is input to the first modified S boxes ($S1_{00}$, $S1_{01}$, $S1_{10}$, $S1_{11}$) $141a$ to $144a$ to the eighth modified S boxes ($S8_{00}$, $S8_{01}$, $S8_{10}$, $S8_{11}$) $141h$ to $144h$, the first to eighth modified S boxes output bit strings of 4 bits $Si_{00}(x)$ $Si_{01}(x)$, $Si_{10}(x)$ and $Si_{11}(x)$ (i=1, 2, ..., 8).

An input and output relation of the first to eighth modified S boxes ($Si_{00}$, $Si_{01}$, $Si_{10}$, $Si_{11}$) $141a$ to $144h$ will be shown below. A sign "+" shows an exclusive OR calculation hereinafter.

Namely, the first to eighth modified S boxes ($Si_{00}$, $Si_{01}$, $Si_{10}$, $Si_{11}$) $141a$ to $144h$ are designed on the basis of a converting table led from the input and output relation so that the first to eighth modified S boxes generate the bit strings of 4 bits from the bit strings of 6 bits to calculate as "$Si_{00}(x)=Si(x+a')+a$, $Si_{01}(x)=Si(x+a')+a-$, $Si_{10}(x)=Si(x+a'-)+a$, $Si_{11}(x)=Si(x+a'-)+a-$" (i=1, 2, ..., 8).

An operation of the encoder 100 according to the first embodiment will be described for each clock cycle by referring to FIG. 3.

[First Clock Cycle]

Initially, the random number generating part 145 generates the random number bit strings ($rmptn_o$, $lmptn_o$). The initial permutation part 105 divides the externally input plaintext block of 64 bits into the upper 32 bits and the lower 32 bits and output the divided plaintext blocks. The exclusive OR 130A performs the exclusive OR calculation of the output upper 32 bits and the mask value ($rmsk_o$) calculated from the random number bit string ($rmptn_o$). The exclusive OR 130B performs the exclusive OR calculation of the output lower 32 bits and the mask value ($lmsk_o$) calculated from the random number bit string ($lmptn_o$). The calculated results are respectively stored in the registers 120L and 120R through the selectors 110L and 110R. Since the random number bit strings ($rmptn_o$, $lmptn_o$) are used in the round function of the first round (a second clock cycle), these random number bit strings are stored. [Second to 16 th clock cycles (round function of j th round, j=1, 2, ..., 15)]

The random number generating part 145 generates the random number bit strings ($rmptn_j$, $lmptn_j$). The exclusive OR $130a$ performs the exclusive OR calculation of the bit string of 32 bits stored in the register 120R and the mask value ($rmsk_j$) calculated from the random number bit string ($rmptn_j$). The next exclusive OR $130b$ performs the exclusive OR calculation of an output of the exclusive OR $130a$ and a mask value ($lmsk_{j-1}$). The calculated result thereof is output to the selectors 110R and 110L and the extension permutation part E150, permutated in the extension permutation part E150 and extended to a bit string of 48 bits. The output of the exclusive OR $130b$ is a left output (a bit string of 32 bits) of the round function of a j th round).

The exclusive OR $130c$ performs the exclusive OR calculation of "E($rmsk_j$)" obtained by performing an extension permutation (E) to the mask value ($rmsk_j$) and the mask value ($ermsk_j$). The exclusive OR $130d$ performs the exclusive OR calculation of the bit string of 48 bits output by the extension permutation part (E) 150 and the output of the exclusive OR $103c$. The exclusive OR $130z$ performs the exclusive OR calculation of the calculated result of the exclusive OR $130d$ and an extension key (a round key: $rkey_j$) input to the round function of the j th round. The bit string of 48 bits obtained in such a way is divided into 8 bit strings (a first bit string to an eighth bit string) respectively composed of 6 bits Then, the first bit string is input to the first group of modified S boxes $140a$ (modified S boxes $141a$ to $144a$) to perform the non-linear conversion explained in FIG. 4. The second bit string to the eighth bit string are also input to the second group of modified S boxes $140b$ to the eighth group of modified S boxes $140h$ that are not shown in the drawing to perform the non-linear conversion explained in FIG. 4.

Selectors $110a$ to $110h$ (selectors $110b$ to $110h$ are not shown in the drawing) determine, for each of the round functions, from which of the modified S boxes ($Si_{00}$, $Si_{01}$, $Si_{10}$, $Si_{11}$), an output is selected on the basis of an i th bit of the random number bit strings "$lmptn_j$" and "$rmptn_j$" respectively for the first group of modified S boxes $140a$ to the eighth group of modified S boxes $140h$.

When the random number bit string of the round function of the j th round is "$rmptn_j$=11010100, $lmptn_j$=01011010", since first bits of "$rmptn_j$" and "$lmptn_j$" are "1" and "0", the selector $110a$ selects an "output of the modified S box ($Sl_{10}$) $143a$" from the first group of modified S boxes $140a$. Outputs of modified S boxes ($Si_{xy}$) selected by the selectors $110a$ to $110h$ are likewise determined by substituting the i th bit of "rmptn$_j$" for "x" and the i th bit of "lmptn$_j$" for "y". It is understood that the selectors 110b to 110h of the second group of modified S boxes 140b to the eighth group of modified S boxes 140h respectively select the modified S boxes of S2$_{11}$, S3$_{00}$, S4$_{11}$, S5$_{01}$, S6$_{10}$, S7$_{01}$, and S8$_{00}$.

The bit strings of 4 bits of the first group of modified S boxes 140a to the eighth group of modified S boxes 140h selected by the selectors 110b to 110h are sequentially concatenated together to be a bit string of 32 bits which is input to the exclusive OR 130e.

After that, the exclusive OR 130e performs the exclusive OR calculation of the concatenated bit string of 32 bits and "P$^{-1}$ (lmptn$_j$)" obtained by performing an inverse calculation of a permutation (P) to the mask value (lmsk$_j$) calculated from the random number bit string (lmptn$_j$). Then, the exclusive OR 130f performs the exclusive OR calculation of an output of the exclusive OR 130e and the mask value (lmsk$_j$). The calculated result is input to the permutation part (P) 160 and permutated.

Subsequently, the exclusive OR 130g performs the exclusive OR calculation of the bit string of 32 bits output from the permutation part (P) 160 and the bit string of 32 bits stored in the register 120L. The exclusive OR 130h performs the exclusive OR calculation of an output of the exclusive OR 130g and a mask value (rmsk$_{j-1}$).

The bit string of 32 bits of the exclusive OR 130h obtained by performing the above-described calculation is input to the selectors 110R and 110L. The selector 110R selects the output (a right side output) of the exclusive OR 130h and outputs to the register 120R. The selector 110L selects the output (a left side output) of the exclusive OR 130b and outputs to the register 120L. Since the random number bit strings (rmptn$_j$, lmptn$_j$) are used for the round function of a j+1 th round, the random number bit strings are stored.

[17 th Clock Cycle (Round Function of 16 th Round)]

The operation of the round function of a 16 th round is the same as those of the round functions of the first to the 15 th rounds that are performed in the second to the 16 th clock cycles except the operations of the selectors 110L and 110R.

In the operation of the round function of the 16 th round performed in a 17 th clock cycle, the selector 110R selects the output (the left side output) of the exclusive OR 130b and transmits the output to the register 120R. The selector 110 selects the output (the right side output) of the exclusive OR 130h and transmits the output to the register 120L. Since the random number bit strings (rmptn$_{16}$, lmptn$_{16}$) are used for the exclusive OR calculation (a mask process) performed immediately before the final permutation FP165, the random number bit strings are stored.

[18 th Clock Cycle]

The exclusive OR 130C performs the exclusive OR calculation of the bit string as the right side output of the round function of the 16 th round stored in the register 120L and a mask value (lmsk$_{16}$) and transmits the calculated result to the final permutation (FP) 165. The exclusive OR calculation is applied to the bit string stored in the register 120R with the mask values (rmsk$_{16}$, lmsk$_{15}$) in the exclusive ORs 130a and 130b. Then, the exclusive OR 130D performs the exclusive OR calculation of the bit string as the left side output of the round function of the 16th round that is output from the exclusive OR 130b and the mask value (rmsk$_{16}$) and transmits the calculated result to the final permutation (FP) 165. The final permutation (FP) 165 concatenates the two bit strings received from the exclusive ORs 130C and 130D and permutates them to output a ciphertext block of 64 bits.

As described above, it can be considered that the encoder 100 includes the S box of the DES in which the mask process is applied to the input bit string by "a'" or "a'−" and the mask process is applied to the output bit string by "a" or "a−" to form the four kinds of modified S boxes and one of the outputs of the modified S boxes is selected at random. Thus, a resistance to a higher order DPA can be ensured.

As similar to the encoder 100, a decoder can be constructed. Similarly, it is considered that the decoder includes the box of the DES in which the mask process is applied to the input bit string by "a'" or "a'−" and the mask process is applied to the output bit string by "a" or "a−" to form the four kinds of modified S boxes and one of the outputs of the modified S boxes is selected at random. Thus, when the ciphertext block is decoded to the plaintext block, a resistance to a higher order DPA can be also ensured.

(First Modified Example 1 of First Embodiment)

As described above, in the first embodiment, the random number generating part 145 generates the two random number bit strings of 8 bits (lmptn$_j$, rmptn$_j$) every time the calculation of the round function of each round (the first round to the 16 th round) is performed.

As compared therewith, in a first modified example of the first embodiment, an explanation will be given to a form where a random number generating part 145 generates two random number bit strings (mptn$_0$, mptn$_1$) of 8 bits in accordance with the calculation of a round function of, for instance, a first round and generates one random number bit string (mptn$_j$) of 8 bits in the calculation of a round function of a j th round (j=2, . . . , 16).

Figure 5:
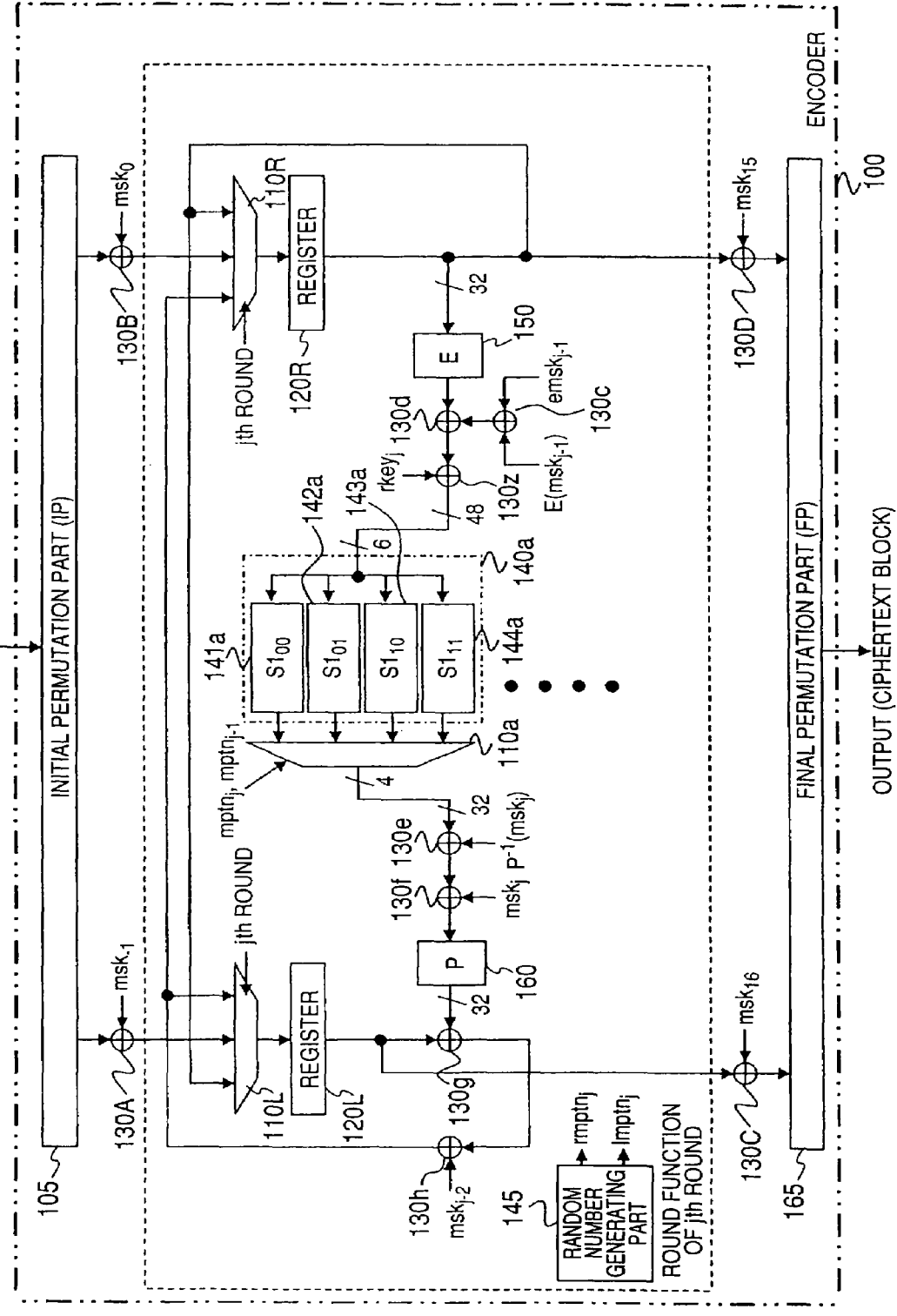
FIG. 5 is a block diagram showing a structure of an encoding calculation circuit according to a first modified example of the first embodiment.

FIG. 5 is a block diagram showing an encoder 100 according to the first modified example of the first embodiment.

The encoder 100 according to the first modified example is different from the first embodiment in a point that exclusive ORs 130a and 130b are not provided. The random number bit string (rmptn$_j$) that is generated by the random number generating part 145 of the first embodiment in the calculation of the round function of the j th round is a random number bit string (mptn$_{j-1}$) generated by a random number generating part 145 according to the first modified embodiment in the calculation of a round function of a j−1 th round. The random number bit string (lmptn$_j$) generated in the calculation of the round function of the j th round by the random number generating part 145 according to the first embodiment is a random number bit string (mptn$_j$) generated in the calculation of a round function of a j th round by the random number generating part 145 according to the first modified example.

An operation of the encoder 100 according to the first modified example is different from that of the first embodiment in view of points that the exclusive ORs 130a and 130b are not provided and the above-described random number bit strings are used as random number bit strings employed for the calculation.

In the encoder 100 according to the first modified example of the first embodiment, the reason why the exclusive ORs 130a and 130b are not provided is described below.

In the first modified example, when the calculation of the round function of the j th round is performed, a mask process and a mask removing process are performed by using the random number bit strings (mptn$_j$, mptn$_{j-1}$) generated during the calculations of the round functions of the j th round and the j−1 th round. Therefore, both mask values used when the exclusive ORs 130a and 130b perform exclusive OR calculations are (msk$_{j-1}$), so that the exclusive ORs 130a and 130b are not necessary.

As described above, in the encoder 100 according to the first modified example of the first embodiment, since four kinds of S boxes are used, an analysis by a DPA and a higher DPA is difficult and the number of times of generations of the random number bit strings during performing an encoding calculation can be reduced to achieve a high speed calculation.

A decoder can be constructed that can reduce the number of times of generations of the random number bit strings during performing an encoding calculation and makes the analysis by the DPA and the higher order DPA difficult by using the four kinds of S boxes.

(Second Modified Example of First Embodiment)

As described above, in the first embodiment, the four kinds of modified S boxes ($Si_{00}$, $Si_{01}$, $Si_{10}$, $Si_{11}$) (i=1, 2, . . . , 8) are prepared by considering the mask process to be applied to the input bit string by "a'" or "a'–" in the S box of the DES and the mask process to be applied to the output bit string by "a" or "a–".

As compared therewith, in a second modified example, for instance, two kinds of modified S boxes ($Si_{00}$, $Si_{10}$) are prepared and two exclusive ORs are prepared for respectively inverting all bits of the outputs of the two modified S boxes ($Si_{00}$, $Si_{10}$).

Figure 6:
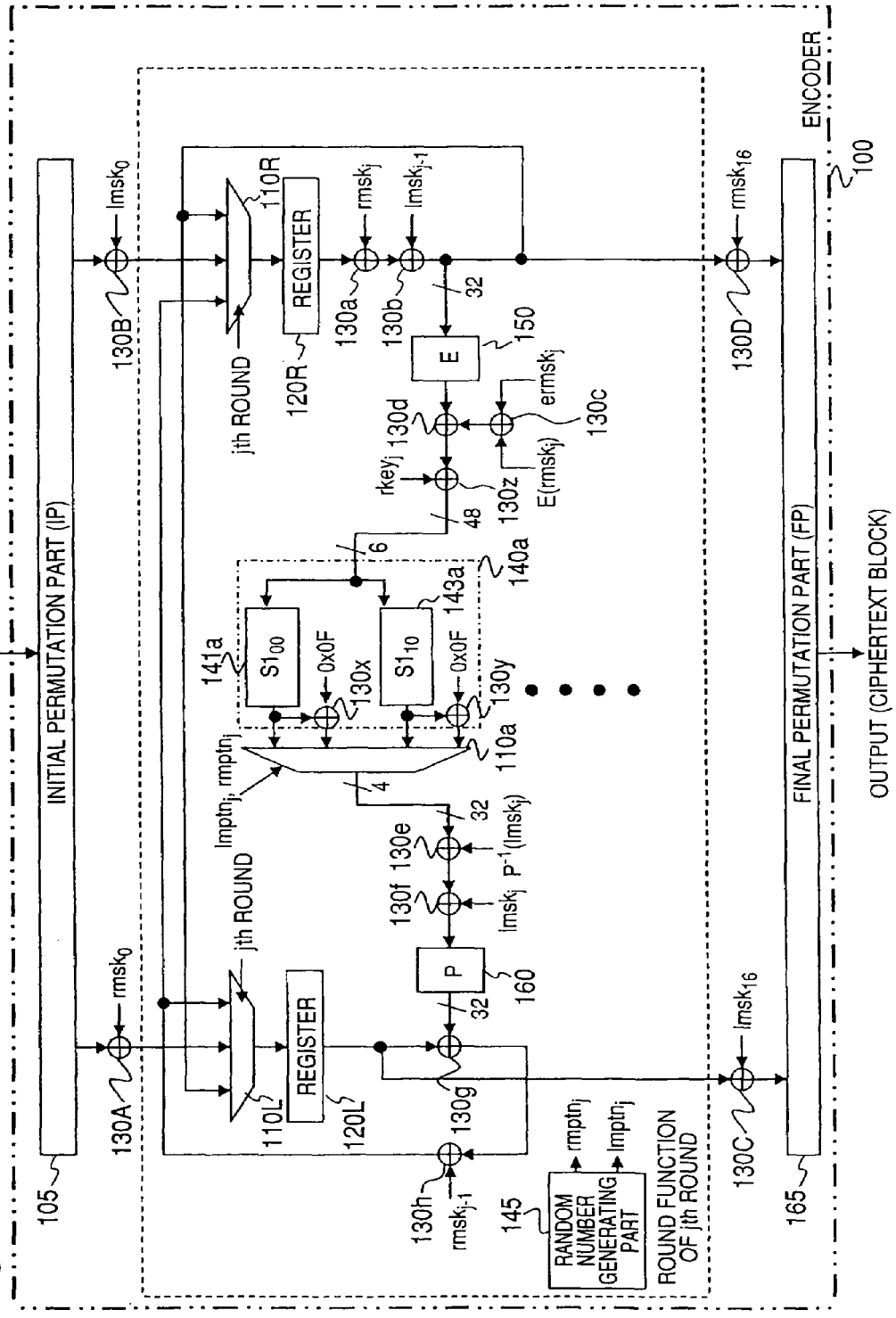
FIG. 6 is a block diagram showing a structure of an encoding calculation circuit according to a second modified example of the first embodiment.

FIG. 6 is a block diagram showing an encoder 100 according to the second modified example of the first embodiment.

The encoder 100 according to the second modified example is different from the first embodiment in view of points that the modified S boxes ($Sl_{01}$, $Sl_{11}$) 142a and 144a are not provided and an exclusive OR 130x for inverting all bits of the output of the modified S box ($S1_{00}$) 141a and an exclusive OR 130y for inverting all bits of the output of the modified S box ($S1_{10}$) 143a are further provided.

An operation of the encoder 100 according to the second modified example is different from that of the first embodiment in view of points that a non-linear conversion is not performed in the two modified S boxes ($S1_{01}$, $S1_{11}$), the exclusive OR 130x inverts all the bits of the output of the modified S box ($S1_{00}$) 141a and the exclusive OR 130y inverts all the bits of the output of the modified S box ($S1_{11}$) 144a, and a selector 110a selects anyone of outputs of the modified S box ($S1_{00}$) 141a as an input, the exclusive OR 130x "regarded as the modified S box ($S1_{01}$)", the modified S box ($S1_{10}$) 143a or the exclusive OR 130y "regarded as the modified S box ($S1_{11}$)" by using random number bit strings ($lmptn_j$, $rmptn_j$). A method that the selector 110a selects one from the four outputs by using the random number bit strings ($lmptn_j$, $rmptn_j$) is the same as the method described in the first embodiment.

As described above, according to the encoder 100 of the second modified example, the two kinds of the modified S boxes (for instance, $S1_{00}$, $S1_{10}$) and elements for inverting the bits of the outputs thereof are used so that an analysis by a DPA and a higher order DPA can be made to be difficult and the scale of a circuit of the encoder 100 can be reduced.

The two kinds of the modified S boxes (for instance, $S1_{00}$, $S1_{10}$) and elements for inverting the bits of the outputs thereof are used so that a decoder can be constructed in which the scale of a circuit can be reduced and an analysis by a DPA and a higher order DPA can be made to be difficult.

(Basic Structure of AES)

Figure 7:
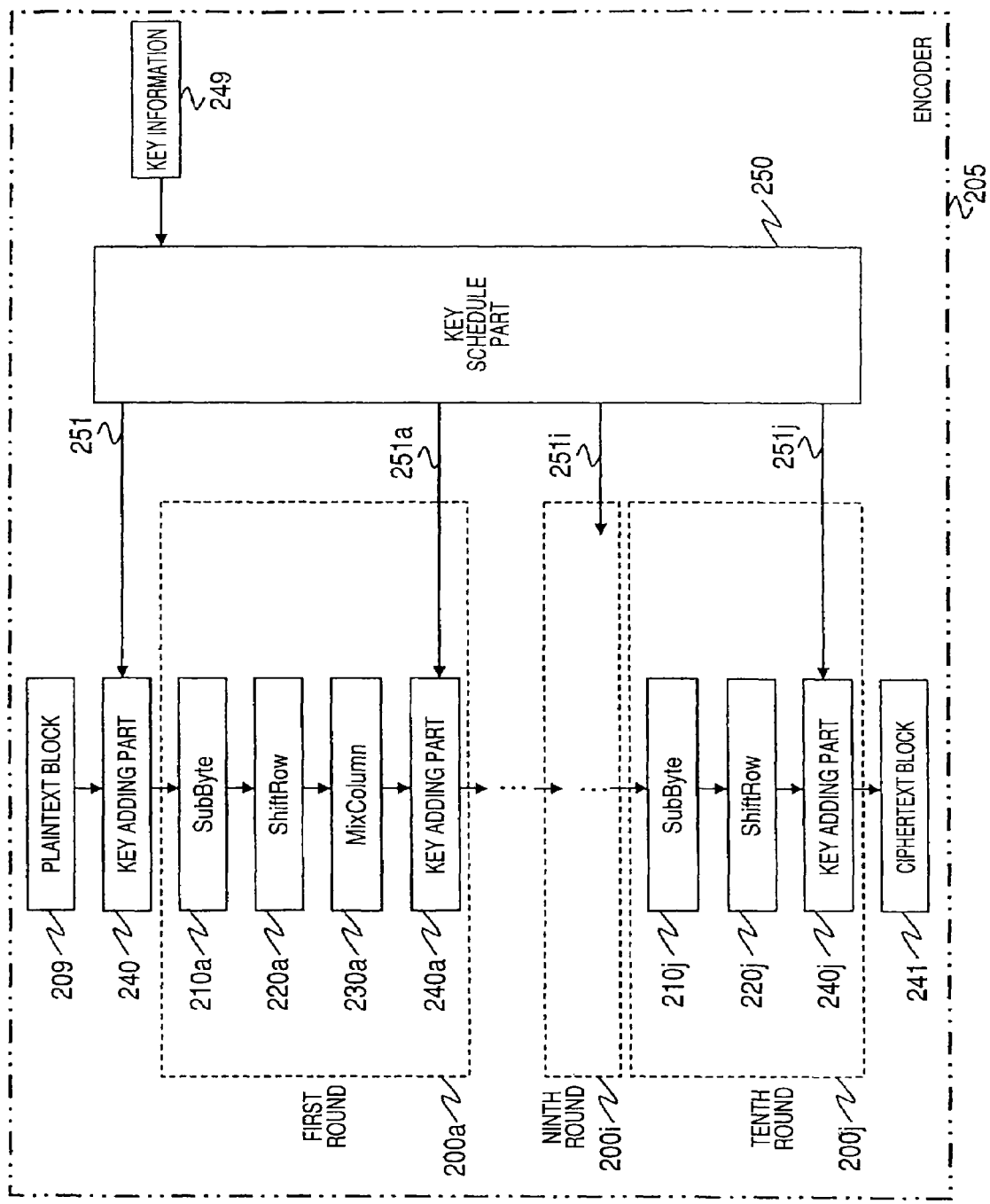
FIG. 7 is a block diagram showing a basic structure of an encoder based on an encoding algorithm AES.

FIG. 7 is a block diagram showing a basic structure of an encoder 205 of an encoding algorithm AES (Advanced Encryption Standard).

A key schedule part 250 calculates extension keys 251 and 241a to 251j of, for instance, 128 bits, by using key information 249 held as secret information and supplies the extension keys 251 and 251a to 251j to a key adding part 240 and key adding parts 240a to 240j of respective rounds. For instance, a plaintext block of 128 bits is added to the extension key 251 in the key adding part 240 and agitated in round functions 200a to 200j of first to tenth rounds including the additions to the extension keys 251a to 251 to become a ciphertext block.

The round functions 200a to 200i of the first to the ninth rounds perform processes to input bit strings in SubBytes 210a to 210i, ShiftRows 220a to 220i, MixColumns 230a to 230i and the key adding parts 240a to 240i. In FIG. 7, only a structure of the round function 200a of the first round is shown. The round function 200j of the tenth round performs processes in a SubByte 210j, a ShiftRow 220j and the key adding part 240j to an input bit string.

The SubBytes 210a to 210j, the ShiftRows 220a to 220j and the MixColumns 230a to 230i divide the input bit string (128 bits) into 16 blocks at intervals of bit strings of 8 bits to process. The 16 blocks are designated hereinafter by $s_{0,0}$, $s_{1,0}$, $s_{2,0}$, $s_{3,0}$, $s_{0,1}$, $s_{1,1}$, $s_{2,1}$, $s_{3,1}$, $s_{0,2}$, $s_{1,2}$, $s_{2,2}$, $s_{3,2}$, $s_{0,3}$, $s_{1,3}$, $s_{2,3}$, $s_{3,3}$.

The SubBytes 210a to 210j include 16 S boxes for performing a non-linear conversion to the input bit strings of 8 bits to output the bit strings of 8 bits. That is, in the SubBytes 210a to 210j, the 16 blocks "$s_{i,k}$" (bit strings of 8 bits) as the input bit strings are respectively converted into "$S(s_{i,k})$" as the output bit strings.

The ShiftRows 220a to 22j convert the 16 blocks [$s_{i,0}$, $s_{i,1}$, $s_{i,2}$, $s_{i,3}$] (i=0, 1, 2, 3) into [$s_{i,0 \circ i}$, $s_{i,1 \circ i}$, $s_{i,2 \circ i}$, $s_{i,3 \circ i}$]. Symbol "o" shows an addition modulo four. Namely, when the 16 blocks is represented by a matrix, each row is changed.

The MixColumns 230a to 230i perform a matrix conversion of an equation 2 on $GF(2^8)$ by regarding the data of 8 bits of each data block as a number of an octal extension body of $GF(2^8)$ of $GF(2)$ having an equation 1 established as a defined polynomial.

$$b(x) = x^8 + x^4 + x^3 + x + 1 \tag{1}$$

$$\begin{pmatrix} s'_{0,i} \\ s'_{1,i} \\ s'_{2,i} \\ s'_{3,i} \end{pmatrix} = \begin{pmatrix} 02 & 03 & 01 & 01 \\ 01 & 02 & 03 & 01 \\ 01 & 01 & 02 & 03 \\ 03 & 01 & 01 & 02 \end{pmatrix} \begin{pmatrix} s_{0,i} \\ s_{1,i} \\ s_{2,i} \\ s_{3,i} \end{pmatrix} \tag{2}$$

In the AES having a key length of 128 bits, in the key adding parts 240, and 240a to 240j, the exclusive OR calculation of the input bit strings of 128 bits and the extension keys of 128 bits are performed.

(Second Embodiment)

Figure 8:
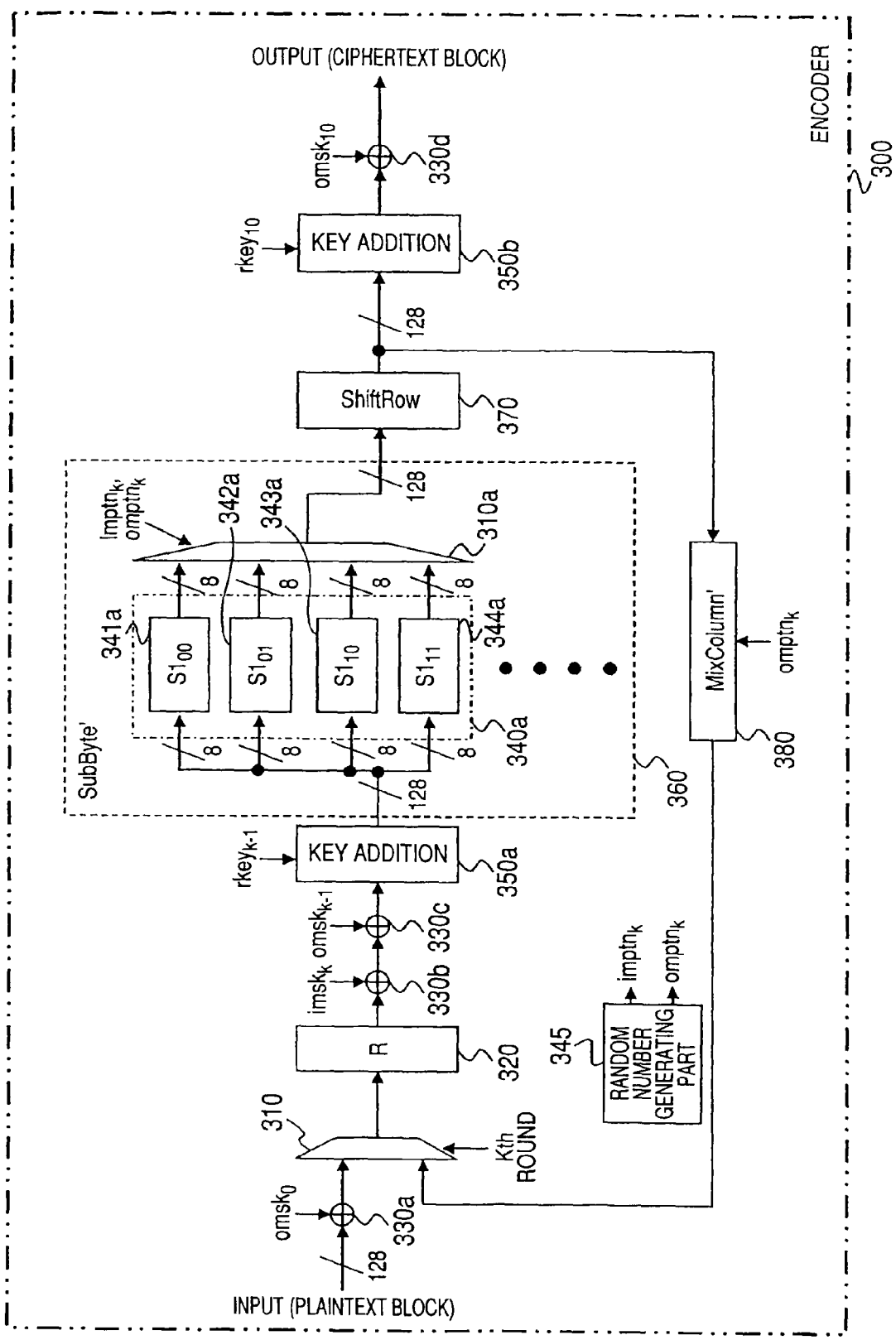
FIG. 8 is a block diagram showing a structure of an encoding calculation circuit according to a second embodiment.

FIG. 8 is a block diagram showing an encoder 300 according to a second embodiment.

The encoder 300 according to the second embodiment includes an exclusive OR 330a for performing a mask process before a plaintext block is input to a round function of a first round, a selector 310 for selecting the masked plaintext block and an output of the round function, a register 320 for storing the input of the round function, exclusive ORs 330b and 330c for performing exclusive OR calculations for a mask process or a mask removing process, a key adding part 350a for performing an exclusive OR calculation of the output of the exclusive OR 330c and an extension key ($rkey_{k-1}$), a SubByte' 360, a ShiftRow 370, a MixColumn' 380, a key adding part 350b of a round function of a 10 th round, an exclusive OR 330d for outputting a ciphertext block and a random number generating part 345 that generates a random number bit string for each round function.

The SubByte' 360 includes four respectively different modified S boxes 341a to 344a (a first group of modified S boxes 340a) that are formed in accordance with a non-linear converting system of the S box (S1: not shown in the drawing)

of an AES and a selector 310a for selecting one of outputs of the four modified S boxes 341a to 344a of the first group of modified S boxes 340a.

16 groups of modified S boxes 341a to 344a are provided, however, in FIG. 8, other boxes are omitted owing to the size of a sheet. Accordingly, in FIG. 8, it is understood that there are the first group of modified S boxes 340a including the four respectively different modified S boxes to the 16 th group of modified S boxes 340p which are respectively formed in accordance with the non-linear converting system. It is understood that there are selectors 310a to 310p for respectively selecting the outputs of the first group of modified S boxes 340a to the 16 th group of modified S boxes 340p.

The selectors 310 and 310a to 310p, the register 320, the exclusive ORs 330a to 330d, the groups of modified S boxes 340a to 340p, the key adding parts 350a and 350b, the ShiftRow 370 and the MixClumn' 380 operate synchronously with a clock signal.

The random number generating part 345 generates two random number bit strings of 16 bits ($imptn_k$, $omptn_k$) (k=1, 2, . . . , 10) respectively for the calculation of the round functions (from the first round to the 10 th round).

Mask values ($imsk_k$, $omsk_k$) of 128 bits are mask values generated in accordance with the random number bit strings ($imptn_k$, $omptn_k$) of 16 bits and a mask value "a" of 8 bits that is predetermined in the encoder 300.

The mask values of ($imsk_k$, $omsk_k$) of 128 bits are generated by respectively extending the bits of the random number bit strings ($imptn_k$, $omptn_k$) of 16 bits to 8 bits. For instance, when the random number bit string ($imptn_k$) is "1101010011010100", the mask value ($imsk_k$) of 128 bits is set to "a–∥a–∥a∥a–∥a∥a–∥a∥a∥a–∥a–∥a∥a–∥a∥a–∥a∥a". A method for generating the mask value ($omsk_k$) of 128 bits is the same as that for generating the mask value ($imsk_k$).

Figure 9:
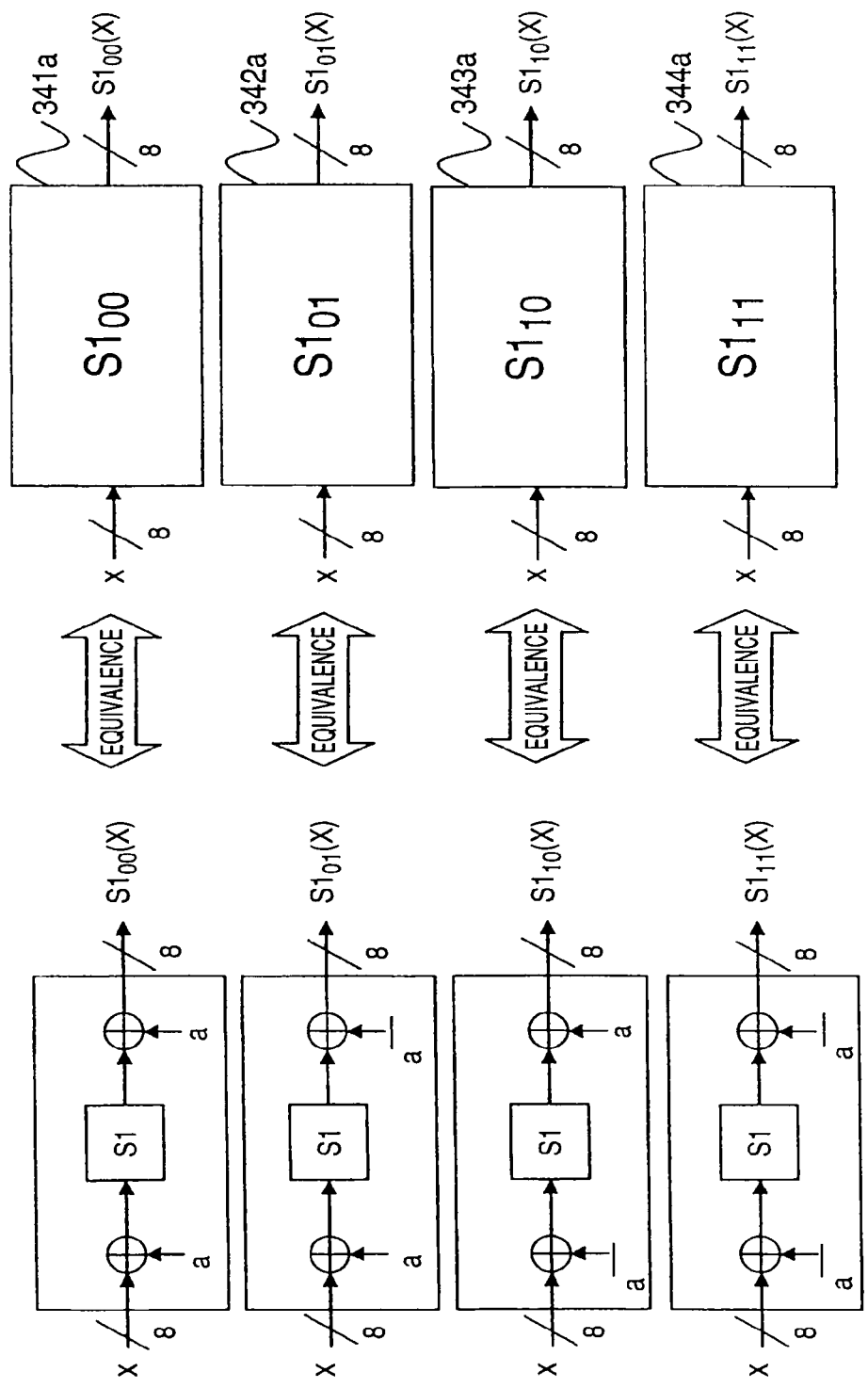
FIG. 9 is a block diagram showing equivalent circuits of modified S boxes ($S1_{00}$, $S1_{01}$, $S1_{10}$, $S1_{11}$) according to the second embodiment.

FIG. 9 is a block diagram showing equivalent circuits of the modified S boxes ($S1_{00}$, $S1_{01}$, $S1_{10}$, $S1_{11}$) 341a to 344a provided in the first group of modified S boxes 340a in a left side. It is understood that the S (S1) boxes of the AES in the equivalent circuits shown in FIG. 9 have the same structures and operations as those of the second group of modified S boxes 340b to the 16 th group of modified S boxes 340p that are not shown in the drawing.

When a bit string x of 8 bits is input to the S boxes (Si) of the AES (i=1, 2, . . . , 16, in this case, all Si are equal), the S boxes respectively output bit strings Si(x) of 8 bits. That is, when the bit string x of 8 bits is input to the modified S boxes ($Si_{00}$, $Si_{01}$, $Si_{10}$, $Si_{11}$) 341a to 344a, the modified S boxes respectively output bit strings of 8 bits $Si_{00}(x)$ $Si_{01}(x)$, $Si_{10}(x)$ and $Si_{11}(x)$.

A relation between the input "x" of the modified S boxes ($Si_{00}$, $Si_{01}$, $Si_{10}$, $Si_{11}$) 341a to 344p and the output $Si_{00}(x)$, $Si_{01}(x)$, $Si_{10}(x)$, and $Si_{11}(x)$ will be shown below. A sign "+" shows an exclusive OR calculation.

Namely, the modified S boxes ($Si_{00}$, $Si_{01}$, $Si_{10}$, $Si_{11}$) 341a to 344p are designed so that calculations of "$Si_{00}(x)=Si(x+a)+a$, $SiO_1(x)=Si(x+a)+a-$, $Si_{10}(x)=Si(x+a-)+a$, $Si_{11}(x)=Si(x+a-)+a-$" are performed on the basis of a converting table led from the relation between the input and the output.

The modified S boxes ($Si_{00}$, $Si_{01}$, $Si_{10}$, $Si_{11}$) 341a to 344p include eight input lines (one corresponds to 1 bit) and eight output lines (one corresponds to 1 bit) and are formed with suitable combinations of wiring and logical elements (NAND, NOR or the like) for connecting the input lines to the output lines. At this time, circuits for realizing the modified S boxes ($Si_{00}$, $Si_{01}$, $Si_{10}$, $Si_{11}$) 341a to 344p are designed not by connecting exclusive OR calculating circuits to the S box circuits of the AES, but in accordance with a new converting table led from the relation between the input and output.

An operation of the encoder 300 according to the second embodiment will be described for each clock cycle by referring to FIG. 8.

[First Clock Cycle]

Initially, the random number generating part 345 generates the random number bit strings ($imptn_o$, $omptn_0$). The exclusive OR 330a performs the exclusive OR calculation of an externally received plaintext block of 128 bits and the mask value ($omsk_0$) calculated from the random number bit string ($omptn_o$). The calculated result is stored in the register 320 through the selector 310. Since the random number bit string ($omptn_o$) is used in the round function of the first round (a second clock cycle), the random number bit string is stored in a memory that is not shown in the drawing.

[Second to 10 th Clock Cycles (Round Function of k th Round, k=1, 2, . . . , 9)

The random number generating part 345 generates the random number bit strings ($imptn_k$, $omptn_k$). The exclusive OR 330b performs the exclusive OR calculation of the bit string of 128 bits stored in the register 320 and the mask value ($imsk_k$). The next exclusive OR 330c performs the exclusive OR calculation of an output of the exclusive OR 330b and a mask value ($omsk_{k-1}$) The key adding part 350a that receives the calculated result thereof performs the exclusive OR calculation with the extension key ($rkey_{k-1}$).

The bit strings obtained in such a way are divided into 16 blocks respectively composed of 8 bit and input to the first group of modified S boxes to the 16 th group of modified S boxes (340a to 340p). That is, 121 th to 128 th bits form the 16 th block.

The first group of modified S boxes 340a (modified S boxes 341a to 344a) performs a non-linear converting process to the input bit string to the first block. Similarly, the second to the 16 th groups of modified S boxes 340b to 340p (modified S boxes 341b to 344p, respectively) perform non-linear converting processes to the input bit strings to the second to the 16 th blocks.

Then, the selectors 310a to 310p select outputs of the modified S boxes ($Si_{00}$, $Si_{01}$, $Si_{10}$, $Si_{11}$) respectively for the first group of modified S boxes 340a to the 16 th group of modified S boxes 340p on the basis of an i th bit (i=1, 2, . . . , 16) of the random number bit strings "$imptn_k$, $omptn_k$".

When the random number bit string of the round function of the k th round is "$imptn_k$=1101010011010100, $omptn_k$=0101101001011010", since first bits of "$imptn_k$" and "$omptn_k$" are "1" and "0", the selector 310a selects an "output of the modified S box ($Sl_{10}$) 343a" from the first group of modified S boxes 340a. Outputs of modified S boxes ($Si_{x,y}$) selected by the selectors 310a to 310p are likewise determined by substituting the i th bit of "$imptn_k$" for "x" and the i th bit of "$omptn_k$" for "y". It is understood that the selectors 310b to 310p of the second group of modified S boxes 340b to the 16 th group of modified S boxes 340p respectively select the outputs of the modified S boxes of $S2_{11}$, $S3_{00}$, $S4_{11}$, $S5_{01}$, $S6_{10}$, $S7_{01}$, $S8_{00}$, $S9_{10}$, $S10_{11}$, $S11_{00}$, $S12_{11}$, $S13_{00}$, $S14_{10}$, $S15_{01}$ and $S16_{00}$".

The bit strings of 8 bits output from the first group of modified S boxes 340a to the 16 th group of modified S boxes 340p selected by the selectors 310a to 310p are sequentially concatenated together to be a bit string of 128 bits which is input to the ShiftRow 370.

After that, the ShiftRow 370 performs the above-described converting process to the concatenated bit string of 128 bits. The random number bit string ($omptn_k$) is changed so as to meet a process performed in the ShiftRow 370.

The MixColumn' 380 performs a process to the output of the ShiftRow 370 so that mask values (a or a–) of $s'_{i,k}$ correspond to mask values of $s_{i,k}$. Specifically, when the mask values corresponding to $(s_{0,k}, s_{1,k}, s_{2,k}, s_{3,k})$ are $(a_{0,k}, a_{1,k}, a_{2,k}, a_{3,k})$, the MixColumn' 380 performs a process corresponding to an equation 3.

$$\begin{pmatrix} s'_{0,j} \\ s'_{1,j} \\ s'_{2,j} \\ s'_{3,j} \end{pmatrix} = \begin{pmatrix} 02 & 03 & 01 & 01 \\ 01 & 02 & 03 & 01 \\ 01 & 01 & 02 & 03 \\ 03 & 01 & 01 & 02 \end{pmatrix} \begin{pmatrix} s_{0,j} \\ s_{1,j} \\ s_{2,j} \\ s_{3,j} \end{pmatrix} + \begin{pmatrix} 03*(a_{0,j}+a_{1,j})+01*(a_{0,j}+a_{2,j})+01*(a_{0,j}+a_{3,j}) \\ 01*(a_{1,j}+a_{0,j})+03*(a_{1,j}+a_{2,j})+01*(a_{1,j}+a_{3,j}) \\ 01*(a_{2,j}+a_{0,j})+01*(a_{2,j}+a_{1,j})+03*(a_{2,j}+a_{3,j}) \\ 03*(a_{3,j}+a_{0,j})+01*(a_{3,j}+a_{1,j})+01*(a_{3,j}+a_{2,j}) \end{pmatrix} \quad (3)$$

The MixColumn' 380 uses the changed random number bit string ($omptn_k$) so as to meet the process performed in the ShiftRow 370. After such a process is performed, the selector 310 selects the output of the MixColumn' 380 and outputs it to the register 320. Since the random number bit string ($omptn_k$) is used in the round function of a k+1 th round, the random number bit string ($omptn_k$) is stored.

[11 th Clock Cycle (Round Function of 10 th Round)]

The operations of the round functions of the first to the ninth rounds performed in the second to the tenth clock cycles and the bit string stored in the register 320 repeat the above-described operations in accordance with mask values of the rounds respectively until the process by the ShiftRow 370 is performed.

In the 11 th clock cycle, the output of the ShiftRow 370 becomes an input of the key adding part 350b. The key adding part 350b performs the exclusive OR calculation of the input bit string of 128 bits from the ShiftRow 370 and an extension key ($rkey_{10}$). The exclusive OR 330d performs the exclusive OR calculation of the calculated result of the key adding part 350b and a random number bit string ($omptn_{10}$) changed so as to meet the process performed in the ShiftRow 370 to output the ciphertext block of 128 bits.

As described above, in the encoder 300 according to the second embodiment, the mask process is considered to be applied to the input bit string and the output bit string by "a" or "a–" in the S box of the AES to form the four kinds of modified S boxes and select at random which of the modified S boxes is to be used. Thus, a resistance to a higher order DPA can be ensured.

Similarly to the encoder 300 according to the second embodiment, a decoder can be constructed that includes the four kinds of modified S boxes formed by considering the mask process to be applied to the input bit string and the output bit string by "a" or "a–" in the S box of the AES and selects at random which of the modified S boxes is to be used. Thus, a resistance to a higher order DPA can be also ensured.

(First Modified Example of Second Embodiment)

As described above, in the second embodiment, the random number generating part 345 generates the two random number bit strings of 16 bits ($imptn_k$, $omptn_k$) every time the calculation of the round function of each round (the first round to the 10 th round) is performed.

As compared therewith, in a first modified example of the second embodiment, a random number generating part 345 generates two random number bit strings ($mptn_0$, $mptn_1$) of 16 bits in accordance with the calculation of a round function of, for instance, a first round and generates one random number bit string ($mptn_k$) of 16 bits in the calculation of a round function of a k th round (k=2, . . . , 10).

Figure 10:
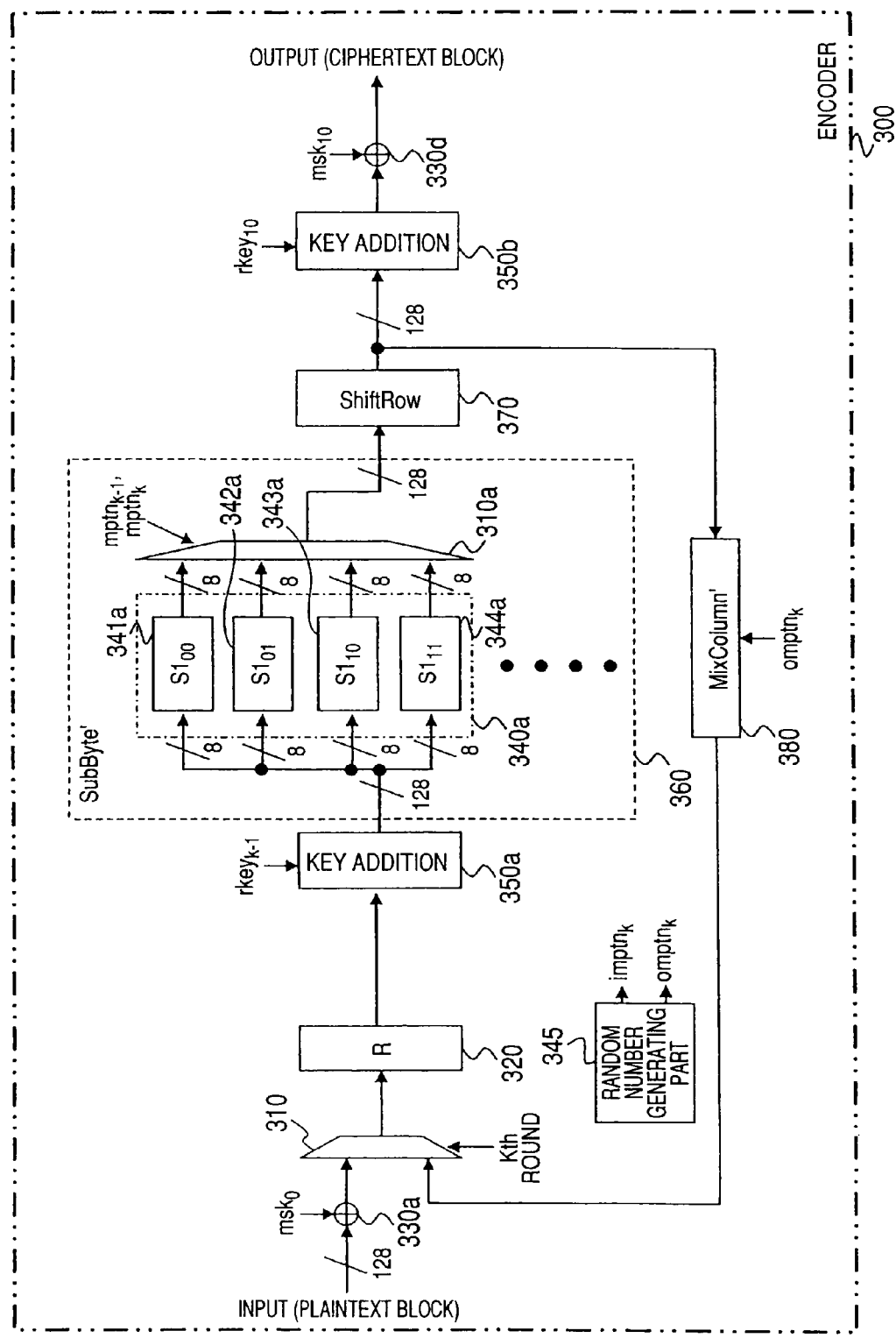
FIG. 10 is a block diagram showing a structure of an encoding calculation circuit according to a first modified example of the second embodiment.

FIG. 10 is a block diagram showing an encoder 300 according to the first modified example of the second embodiment.

The encoder 300 according to the first modified example is different from the second embodiment in a point that exclusive ORs 330b and 330c are not provided. The random number bit string ($imptn_k$) that is generated by the random number generating part 345 of the second embodiment in the calculation of the round function of a k th round is a random number bit string ($mptn_{k-1}$) generated by a random number generating part 345 according to the first modified example in the calculation of a round function of a k–1 th round. The random number bit string ($omptn_k$) generated in the calculation of the round function of the k th round by the random number generating part 345 according to the second embodiment is a random number bit string ($mptn_k$) generated in the calculation of a round function of a k th round by the random number generating part 345 according to the first modified example.

An operation of the encoder 300 according to the first modified example is different from that of the second embodiment in view of points that the exclusive ORs 330b and 330c are not provided and the above-described random number bit strings are used as random number bit strings employed for the calculation.

In the encoder 300 according to the first modified example of the second embodiment, the reason why the exclusive ORs 330b and 330c are not provided is described below.

In the encoder 300 according to the first modified example of the second embodiment, when the calculation of the round function of the k th round is performed, a mask process and a mask removing process are performed by using the random number bit strings ($mptn_k$, $mptn_{k-1}$) generated during the calculations of the round functions of the k th round and the k–1 th round. Therefore, both mask values used when the exclusive ORs 330b and 330c perform exclusive OR calculations are ($msk_{k-1}$), so that the exclusive ORs 330b and 330c are not necessary.

As described above, in the encoder 300 according to the first modified example of the second embodiment, since four kinds of S boxes are used, an analysis by a DPA and a higher DPA is difficult and the number of times of generations of the random number bit strings during performing an encoding calculation can be reduced to achieve a high speed calculation.

A decoder can be constructed that can reduce the number of times of generations of the random number bit strings during performing an encoding calculation and makes the analysis by the DPA and the higher order DPA difficult by using the four kinds of S boxes.

(Second Modified Example of Second Embodiment)

As described above, in the second embodiment, the four kinds of modified S boxes ($Si_{00}$, $Si_{01}$, $Si_{10}$, $Si_{11}$) (i=1, 2, . . . , 8) are prepared by considering the mask process to be applied to the input bit string by "a" or "a–" in the S box of the AES and the mask process to be applied to the output bit string by "a" or "a–".

As compared therewith, in a second modified example of the second embodiment, for instance, two kinds of modified S boxes ($Si_{00}$, $Si_{10}$) are prepared and two exclusive ORs are prepared for respectively inverting all bits of the outputs of the two modified S boxes ($Si_{00}$, $Si_{10}$).

Figure 11:
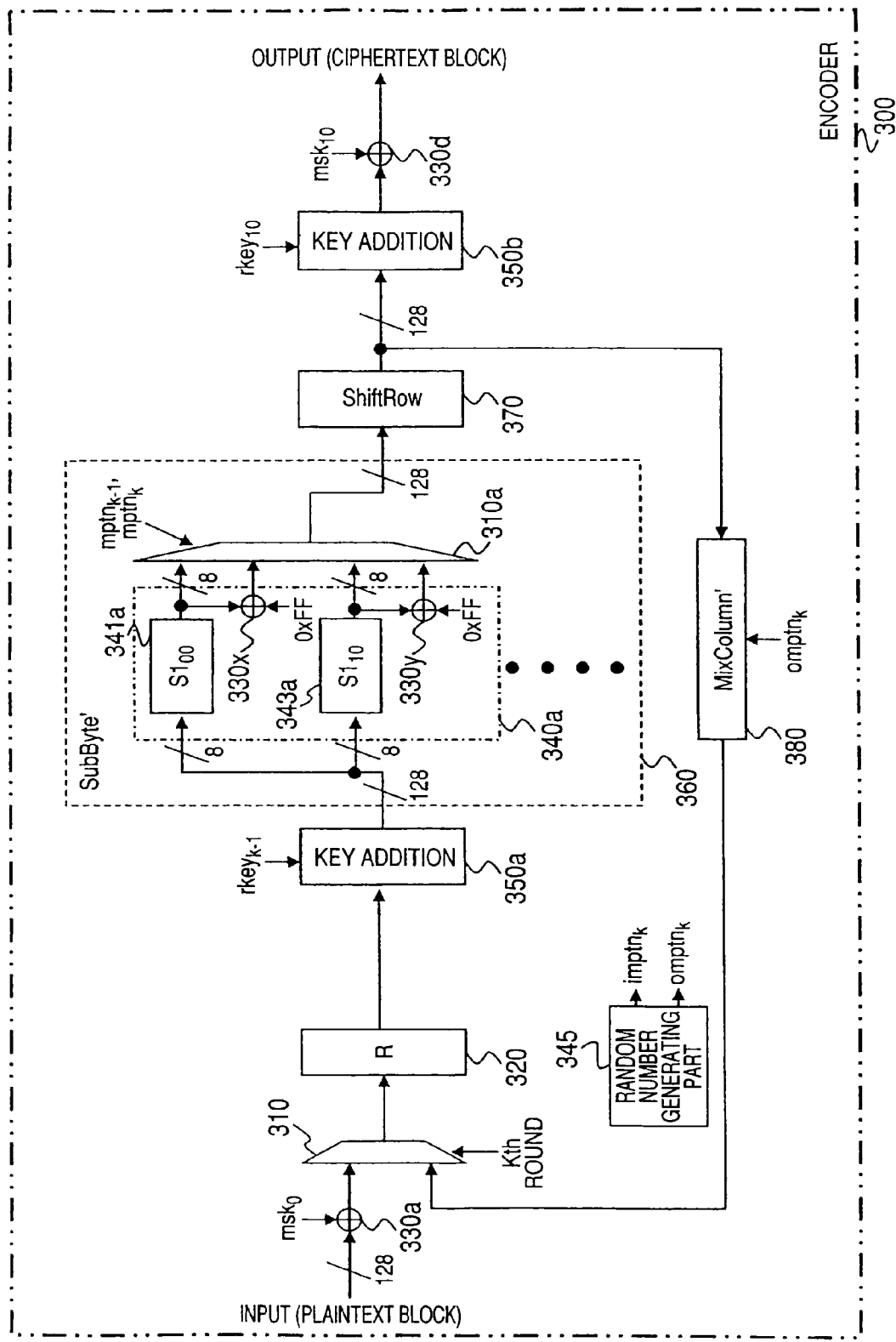
FIG. 11 is a block diagram showing a structure of an encoding calculation circuit according to a second modified example of the second embodiment.

FIG. 11 is a block diagram showing an encoder 300 according to the second modified example of the second embodiment.

The encoder 300 according to the second modified example is different from the second embodiment in view of points that the modified S boxes ($Sl_{01}$, $Sl_{11}$) 342a and 344a are not provided and an exclusive OR 330x for inverting all bits of the output of the modified S box ($S1_{00}$) 341a and an exclusive OR 330y for inverting all bits of the output of the modified S box ($S1_{10}$) 343a are further provided.

An operation of the encoder 300 according to the second modified example of the second embodiment is different from that of the second embodiment in view of points that an operation (a non-linear conversion) is not performed in the modified S boxes ($S1_{01}$, $S1_{11}$), the exclusive OR 330x inverts all the bits of the output of the modified S box ($S1_{00}$) 341a and the exclusive OR 330y inverts all the bits of the output of the modified S box ($S1_{10}$) 343a, and a selector 310a selects any one of outputs of the modified S box ($S1_{00}$) 341a as an input, the exclusive OR 330x, the modified S box ($S1_{10}$) 343a or the exclusive OR 330y by using the random number bit strings ($imptn_k$, $omptn_k$).

As described above, according to the encoder 300 of the second modified example of the second embodiment, the two kinds of the modified S boxes (for instance, $S1_{00}$, $S1_{10}$) and elements for inverting the bits of the outputs thereof are used so that an analysis by a DPA and a higher order DPA can be made to be difficult and the scale of a circuit of the encoder 300 can be reduced.

The two kinds of the modified S boxes (for instance, $S1_{00}$, $S1_{10}$) and elements for inverting the bits of the outputs thereof are used so that a decoder can be constructed in which the scale of a circuit can be reduced and an analysis by a DPA and a higher order DPA can be made to be difficult.

The present invention is not directly limited to the above-described embodiments and components may be modified and embodied within a scope without departing from a gist thereof in the course of embodying. Further, a plurality of components disclosed in the above-described embodiments may be suitably combined together so that various inventions can be devised. For instance, some components may be deleted from all the components disclosed in the embodiments. Further, the components included in the different embodiments may be suitably combined together.

According to an aspect of the present invention, a resistance to a high-order DPA can be ensured.

What is claimed is:

1. A non-linear data converter including a CPU and comprising:
   a first converter that performs a first process on an input bit string to output a first output bit string, the first process equivalent to performing:
   a mask process using a first mask,
   a non-linear conversion predetermined for performing an encoding or a decoding, and
   a mask process using a second mask;
   a second converter that performs a second process on the input bit string to output a second output bit string, the second process equivalent to performing:
   the mask process using the first mask,
   the non-linear conversion, and
   a mask process using an inverted second mask;
   a third converter that performs a third process on the input bit string to output a third output bit string, the third process equivalent to performing:
   a mask process using an inverted first mask,
   the non-linear conversion, and
   the mask process using the second mask;
   a fourth converter that performs a fourth process on the input bit string to output a fourth output bit string, the fourth process equivalent to performing:
   the mask process using the inverted first mask,
   the non-linear conversion, and
   the mask process using the inverted second mask;
   a generator that generates a random number bit string; and
   a selector that selects any one of the first to fourth output bit strings based on the random number bit string.

2. An encoder comprising:
   a key scheduler that generates a j-th enlarged key from a secret key, j being an integer larger than 1 and smaller than z, z being an integer larger than 2;
   a random number generator that generates a j-th random number bit string;
   a mask generator that generates a j-th first mask and a j-th second mask based on the j-th random number bit string, a predetermined first mask and a predetermined second mask;
   a pre-processor that outputs a first bit string based on an input plaintext block;
   the non-linear data converter of claim 1 as a j-th function calculator that performs an encoding calculation to a j-th bit string to output a (j+1)-th bit string; and
   a post-processor that outputs a ciphertext block based on a (Z+1)-th bit string.

3. A decoder comprising:
   a key scheduler that generates a j-th enlarged key from a secret key, j being an integer larger than 1 and smaller than z, z being an integer larger than 2;
   a random number generator that generates a j-th random number bit string;
   a mask generator that generates a j-th first mask and a j-th second mask based on the j-th random number bit string, a predetermined first mask and a predetermined second mask;
   a pre-processor that outputs a first bit string based on an input ciphertext block;
   the non-linear data converter of claim 1 as a j-th function calculator that performs a decoding calculation to a j-th bit string to output a (j+1)-th bit string; and
   a post-processor that outputs a decoded sentence block based on a (Z+1)-th bit string.

* * * * *